United States Patent [19]

McIntosh

[11] 4,402,676

[45] Sep. 6, 1983

[54] LINK CHAIN STIFFENER

[75] Inventor: Arthur M. McIntosh, Arlington Heights, Ill.

[73] Assignee: Borg-Warner Corporation, Chicago, Ill.

[21] Appl. No.: 262,268

[22] Filed: May 11, 1981

[51] Int. Cl.³ .................... F16G 51/80; F16G 13/02; F16H 7/08
[52] U.S. Cl. .................................. 474/100; 474/201; 474/206
[58] Field of Search ............... 474/202, 242, 206, 201, 474/100

[56] References Cited

U.S. PATENT DOCUMENTS 4,149,427 4/1979 Ledvina .
4,303,403 12/1981 Lamers ................................ 474/242

Primary Examiner—Lawrence J. Staab
Assistant Examiner—Michael D. Bednarek
Attorney, Agent, or Firm—Aubrey L. Burgress

[57] ABSTRACT

A stiffening arrangement for an endless chain which is constructed of a plurality of interleaved sets of links joined by pivot means which comprises an elongated stiffening member retained in grooves formed in chain side links and which contacts the tops of the links in the chain.

5 Claims, 7 Drawing Figures

LINK CHAIN STIFFENER

BACKGROUND OF THE INVENTION

Power transmission chains are often too flexible and follow random radial motion as the chain leaves the driving sprocket and enters the driven sprocket. The uncontrolled motions cause noise and sprocket/chain wear.

THE INVENTION

According to the invention, a relatively thin elongated band-like member of flexible material, as for example, spring material, is added at the back of the links of a chain to add rigidity to the chain and to reduce the random motion which causes noise and sprocket/chain wear. Preferably, the elongated member is generally transversely curved and is assembled with the convex side toward the chain, the member being held in crowned longitudinal slots in side links which flank the chain body links and which side links extend radially outwardly of the body links. The transversely curved elongated material adds stiffness in the relatively straight portions of the chain and when the chain wraps the sprockets, the elongated member flattens so as not to inhibit wrapping of the chain around the sprocket. A special connecting link is provided with transverse slots to hold the ends of the elongated band-like material in desired positions. The elongated member can be easily assembled with the chain by merely "snapping" it into the assembled chain. Operation is the same regardless of the direction of rotation of the chain.

THE DRAWING

DETAILED DESCRIPTION

Figure 1:
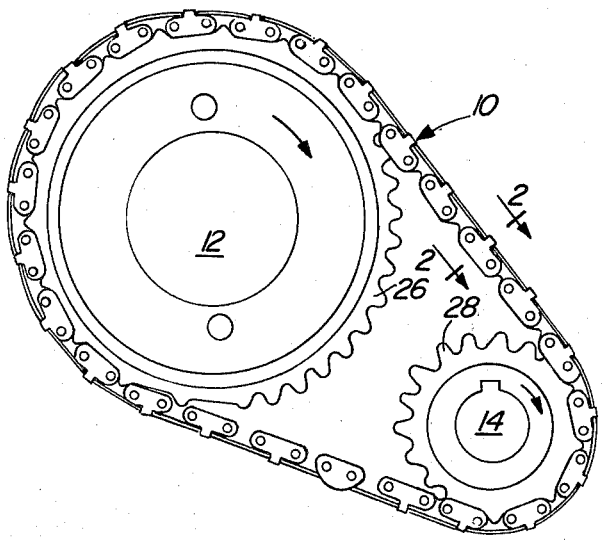
FIG. 1 is a view of a chain constructed according to this invention wrapping a sprocket.
Figure 2:
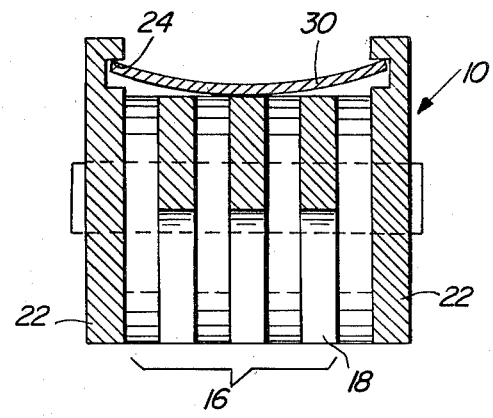
FIG. 2 is a view on line 2—2 of FIG. 1.
Figure 3:
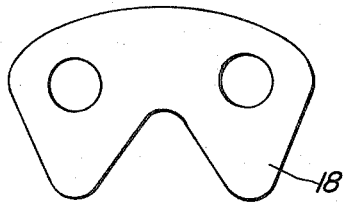
FIG. 3 is a side view of a body link for the chain of FIG. 1.
Figure 4:
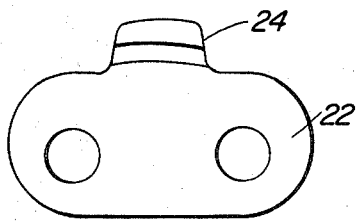
FIG. 4 is an inside view of a side link for the chain of FIG. 1.

The drive arrangement illustrated in FIG. 1 comprises a chain 10 drivingly connecting a pair of spaced sprockets 12 and 14, the chain (see also FIG. 2) comprising a plurality of interleaved sets 16 of links 18, the adjacent sets being joined by pivot means 20, illustrated as round pins. Outside links 22 are provided, as is illustrated, and each outside link is formed with a longitudinal crowned groove 24 which, when assembled with the sets 16 of links 18, face inwardly. Generally, each link 18 as illustrated in FIG. 3 is formed to mesh with the teeth 26, 28 of the sprockets 12 and 14, respectively. A typical outside link 22 is illustrated in FIG. 4.

Figure 6:
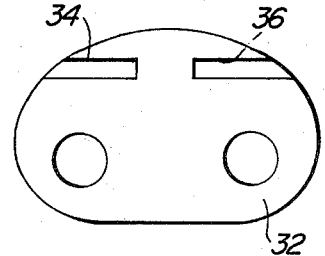
FIG. 6 is a side view of a closure link for the chain of FIG. 1.
Figure 5:
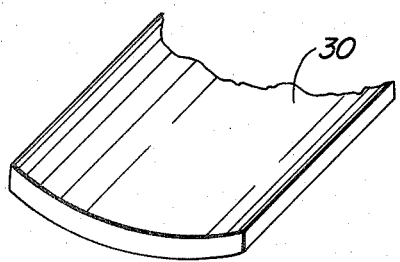
FIG. 5 is a partial perspective view of the elongated flexible material.
Figure 7:
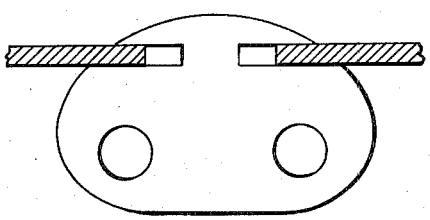
FIG. 7 is a sectional view showing the closure assembly.

The top or outside of the links 18 form (with the grooves 24) a channel to receive an elongated strip of this material 30, the strip being preferably of metal and generally of a spring stock, such that its convex side bears against the outside of the chain links. A series of closure links 32 are provided, each having slots 34 and 36 therein, as illustrated in FIG. 6 to receive the ends of the elongated material 30, as illustrated in FIG. 7.

The elongated member is cut to length and is assembled with the chain by merely "snapping" it into the assembled chain. The invention can be adapted to most of the known link-type chains.

While it is preferable to use a metal strip, strips of plastic material may be used without departing from the spirit of the invention.

I claim:

1. A stiffening arrangement for an endless chain constructed of a plurality of joined body links and flanking side links, said side links each having portions extending radially, and outwardly of said body link, means comprising an inwardly facing longitudinal groove in each side link to define a channel with said body links, and an elongated stiffening member in said channel with its edges in said grooves, said stiffening member having a length substantially the same as that of said chain.

2. A stiffening arrangement as recited in claim 1, wherein said longitudinal grooves are crowned in the direction of chain length.

3. A stiffening arrangement as in claim 1 wherein said elongated member is spring-like with a curved transverse cross-section.

4. A stiffening arrangement as in claim 1 wherein said elongated member is relatively thin metal.

5. A stiffening arrangement as in claim 1, further comprising connecting links having transverse slots for receiving the ends of said elongated stiffening member.

* * * * *

UNITED STATES PATENT AND TRADEMARK OFFICE
CERTIFICATE OF CORRECTION

PATENT NO. : 4,402,676
DATED : September 6, 1983
INVENTOR(S) : ARTHUR M. McINTOSH It is certified that error appears in the above—identified patent and that said Letters Patent is hereby corrected as shown below:

Column 2, line 34, change "body link" to -- body links --.

Signed and Sealed this

First Day of November 1983

[SEAL]

Attest:

GERALD J. MOSSINGHOFF

Attesting Officer

Commissioner of Patents and Trademarks